(12) United States Patent
Nevdahs et al.

(10) Patent No.: US 11,572,197 B1
(45) Date of Patent: Feb. 7, 2023

(54) STATIONS FOR UNMANNED AERIAL VEHICLES

(71) Applicant: Alarm.com Incorporated, Tysons, VA (US)

(72) Inventors: Ilja Nevdahs, Carnikava (LV); Agris Kipurs, Jelgava (LV); Olegs Cevacins, Jurmala (LV); Davids Ezers, Liepaja (LV); Edgars Rozentals, Riga (LV)

(73) Assignee: Alarm.com Incorporated, Tysons, VA (US)

( * ) Notice: Subject to any disclaimer, the term of this patent is extended or adjusted under 35 U.S.C. 154(b) by 389 days.

(21) Appl. No.: 16/820,691

(22) Filed: Mar. 16, 2020

Related U.S. Application Data (60) Provisional application No. 62/819,126, filed on Mar. 15, 2019.

(51) Int. Cl.
| | |
|---|---|
| *B64F 1/00* | (2006.01) |
| *B64F 1/36* | (2017.01) |
| *B64C 39/02* | (2006.01) |
| *B64D 47/08* | (2006.01) |

(52) U.S. Cl.
CPC ............ *B64F 1/362* (2013.01); *B64C 39/024* (2013.01); *B64C 2201/027* (2013.01); *B64C 2201/127* (2013.01); *B64D 47/08* (2013.01)

(58) Field of Classification Search
CPC .............................. B64F 1/362; B64C 39/024
USPC ....................................................... 244/114
See application file for complete search history.

(56) References Cited

U.S. PATENT DOCUMENTS

| | | | |
|---|---|---|---|
| 8,387,911 B2 | 3/2013 | Collette | |
| 10,434,885 B2 | 10/2019 | Antonini et al. | |
| 10,633,115 B2 * | 4/2020 | Pilskalns | ............... B60L 53/126 |
| 2017/0050749 A1 * | 2/2017 | Pilskalns | ................. B64F 1/362 |
| 2017/0101017 A1 | 4/2017 | Streett | |
| 2018/0009549 A1 | 1/2018 | Sullivan et al. | |
| 2018/0137767 A1 * | 5/2018 | Hou | ..................... G08G 5/0026 |
| 2018/0170191 A1 * | 6/2018 | Xing | ..................... H02J 7/0044 |
| 2018/0178665 A1 * | 6/2018 | Chen | ..................... H02J 7/0044 |
| 2018/0245365 A1 * | 8/2018 | Wankewycz | .............. E04H 6/44 |
| 2018/0354620 A1 | 12/2018 | Baek et al. | |
| 2018/0370652 A1 * | 12/2018 | Vendrame | ................ A47B 3/08 |
| 2019/0039719 A1 | 2/2019 | Baek et al. | |
| 2020/0165008 A1 * | 5/2020 | Krauss | ...................... B64F 1/00 |

FOREIGN PATENT DOCUMENTS

EP 3246776 11/2017

* cited by examiner

*Primary Examiner* — Thomas J Lett
(74) *Attorney, Agent, or Firm* — Fish & Richardson P.C.

(57) ABSTRACT

Stations for a drone are described as well as a monitoring system that is configured to monitor a property using one or more drones. The drone is launched from a docking station and configured to navigate the property to perform operations to monitor the property. The docking station is located at an area of the property. The docking station includes a landing surface that is parallel to a particular area of the property that supports the docking station. A positioning surface of the docking station slopes toward the landing surface. The positioning surface, including its slope, is configured to receive the drone and guide the drone toward the landing surface.

21 Claims, 7 Drawing Sheets

STATIONS FOR UNMANNED AERIAL VEHICLES

CROSS-REFERENCE TO RELATED APPLICATION

This application claims the benefit of U.S. Application No. 62/819,126, filed Mar. 15, 2019, which is incorporated by reference in its entirety.

TECHNICAL FIELD

This specification generally relates to unmanned aerial devices.

BACKGROUND

Unmanned aerial vehicles can be configured as monitoring devices or sensors and are often dispersed at various locations at a property, such as a home or commercial business. These sensors and aerial devices can have distinct functions at different locations of the property.

Some unmanned aerial vehicles (UAVs) at a property are autonomous vehicles or drones that offer different types of monitoring and control functionality. The functionality afforded by these drones can be leveraged to secure items at a property, to obtain information about respective items at multiple different properties, and to visually monitor conditions of items located at the properties.

The usefulness and functionality of the drones may be dependent on their size. In some cases, autonomous vehicles such as drones and UAVs may require small or light-weight designs that are beneficial for accomplishing objectives related to legislative initiatives, human and property safety considerations, or minimizing visual and acoustic footprints.

SUMMARY

This specification describes stations, components, and systems for unmanned, autonomous aerial vehicles ("drones").

For example, different configurations of a station that interfaces with a drone are described as well as a monitoring system that is configured to monitor a property using an example drone. The drone is launched from a docking station and configured to navigate and monitor the property. The docking station includes a landing surface that receives and supports the drone. A positioning surface of the docking station is configured to facilitate guiding the drone toward the landing surface. For example, the positioning surface is configured to receive the drone and passively direct or guide the drone to the landing surface.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes stations, components, and systems for drones as well as property monitoring systems for commercial or residential properties that can use the drones to monitor items at the property.

Different configurations of a station that interfaces with a drone are described as well as a monitoring system that is configured to monitor a property using an example drone. The drone is launched from a docking station and configured to navigate the property to monitor items at the property. The docking station includes a landing surface that receives and supports the drone. The docking station also includes an example positioning surface that is different than the landing surface.

The positioning surface is configured to facilitate guiding the drone toward the landing surface. For example, the positioning surface of the docking station slopes toward the landing surface to facilitate directing or guiding the drone toward the landing surface. The docking station includes contact points for interfacing with corresponding contact points of a drone that is received and supported by the docking station. For example, a drone is described that includes electrical contacts at different exterior sections of the drone for interfacing or communicating with the docking station via the contact points of the station.

The property monitoring system may include sensors, such as motion or imaging sensors, at a property to monitor conditions at the property. In addition to the sensors, drones can be positioned at the property to monitor conditions at the property. The monitoring system includes a control unit and controls that enable automation of actions at the property. Security/property monitoring systems can include several sensors, drones, and other devices that perform specific functions at a property. These drones and devices interact with the control units, or directly with a monitoring server, to provide sensor data to the monitoring server and to receive commands from the monitoring server.

Figures 1A, 1B, 1C:
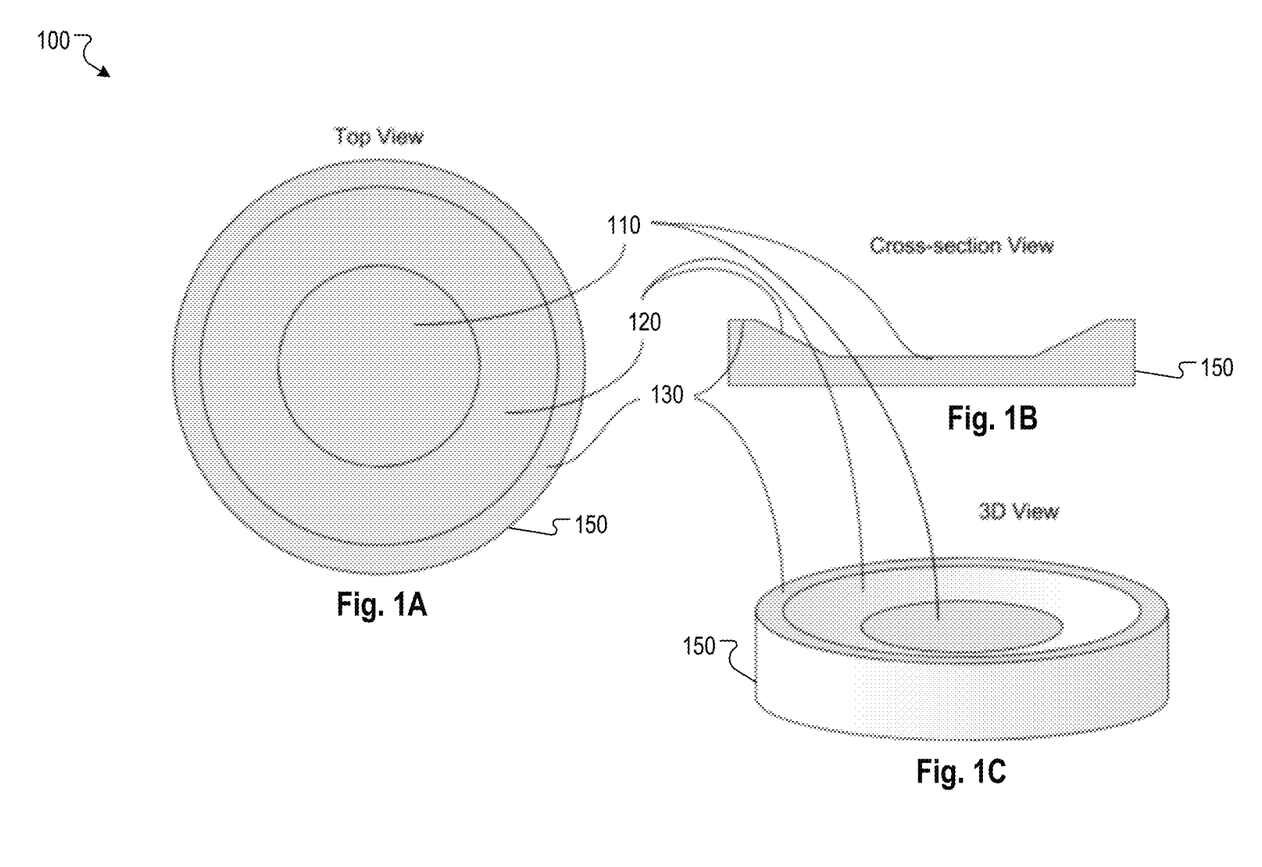
FIGS. 1A, 1B, and 1C show different views of an example station for an unmanned aerial vehicle.

FIG. 1A-1C show different views of an example station 100 for an unmanned aerial vehicle. More specifically, each of FIG. 1A, FIG. 1B, and FIG. 1C show a respective view of station 100 that receives, supports, and interfaces with an example drone. In the examples of FIGS. 1A, 1B, and 1C, a single reference number is used to indicate elements that are common among the distinct views of the station 100. FIG. 1A shows an example top view of the station 100, whereas FIG. 1B and FIG. 1C show an example cross-section view and three-dimensional view, respectively. As used in this disclosure, the term "station" may include, for example, a ground station (GS), a charging station, a base station, a docking station, a landing drone pad, etc.

In some implementations, the station 100 is configured for a drone that is circular, or substantially circular, in shape. In some implementations, the station 100 is configured for a drone that is square, or substantially square, in shape. In some examples, other stations 100 can be designed or manufactured to receive, support, and interface with drones that have a shape other than a circular or square shape. For example, a station 100 can be designed or configured for drones that have any number of shapes, such as a rectangular shape, a polygon (e.g., a regular polygon), or an irregular polygon.

For context, a drone can be configured to launch, or initiate aerial flight, from a surface of the station 100. For example, a drone may takeoff or be launched from the station 100 and perform a surveillance mission. The surveillance mission can be associated with navigating a property to identify or monitor persons and items located at different areas of the property. In some implementations, the drone initiates aerial flight from the station 100 to navigate and monitor conditions at a property, performs an example monitoring session by navigating the property, and then returns to land at the station 100.

The station 100 includes a landing surface 110 that receives and supports a drone. The landing surface 110 may be a flat landing surface that is parallel to, or substantially parallel to, a surface on which the station 100 is positioned. The station 100 includes a positioning surface 120 that is configured to facilitate guiding the drone toward the landing surface 110. The positioning surface 120 is configured to receive the drone and passively direct or guide the drone to the landing surface 110 when the drone returns to the station 100.

The station 100 also includes an edge surface 130 extends inwardly from an outer circumference 150. In some implementations, the edge surface 130 is a horizontal edge surface 130. The edge surface 130 may be introduced to make edges or edge sections of station 100 less sharp, for example, in view of safety concerns. In general, modifications, additions, or omissions may be made to the station 100 without departing from the scope of the present disclosure. For example, in some implementations, the station 100 may include any number of other components that may not be explicitly illustrated or described. Further, depending on certain implementations, the station 100 may not include one or more of the components illustrated and described herein.

The drone may be include a power source such as one or more rechargeable battery cells. After a mission the drone may return back to the station 100 for battery recharge or to communicate data to the station 100. The drone initiates recharging or communication with the station 100 in response to landing at the landing surface 110 and contacting at least one contact point (described below) installed at the landing surface 110. In general, successfully landing or positioning a drone with the high precision required for proper engaging with an example charging contact is challenging.

For example, this action may be challenging due to a variety of factors, such as: i) vertical versus horizontal movement control prioritization; ii) increased lift and turbulence due to ground effect; iii) decreased performance of inertial sensors at the drone or station 100 due to higher vibration levels; iv) decreased performance of barometric pressure sensors of the drone or station 100 due to turbulence; or v) combinations of some (or all) of these. The term "ground effect" may include phenomena such as when a drone is flying close to a ground surface or station surface. These phenomena may include factors such as: increased lift due to redirected and reflected airflow, increased turbulence that makes horizontal position control more difficult, or both.

Hence, in some implementations, it is desirable for a drone, or a user controlling the drone, to be assisted to properly engage contacts (e.g., charging contacts) installed the station 100 to recharge the drone upon return to the station 100.

Further, for a small or ultra-lightweight drone, an expected error of landing on a flat surface may be estimated to be up to +/−ten centimeters (cm). For drone repositioning on the station 100 after landing and engaging charging contacts, prior solutions may have required an extraneous set of actuators to "grab" the drone and reposition it. This requires introduction of additional electro-mechanical components and potential points of failure while also tending to increase costs of the individual stations.

Accordingly, aspects of the present disclosure can be used to address these and other example challenges based on the described techniques for designing and implementing a station surface as well as a drone body 205 and landing gear combination that helps to achieve increased precision with respect to positioning a drone on the station 100. The described techniques can be used to achieve increased precision with respect to positioning a drone on the station 100 after landing without need of any additional actuators.

Figure 2A:
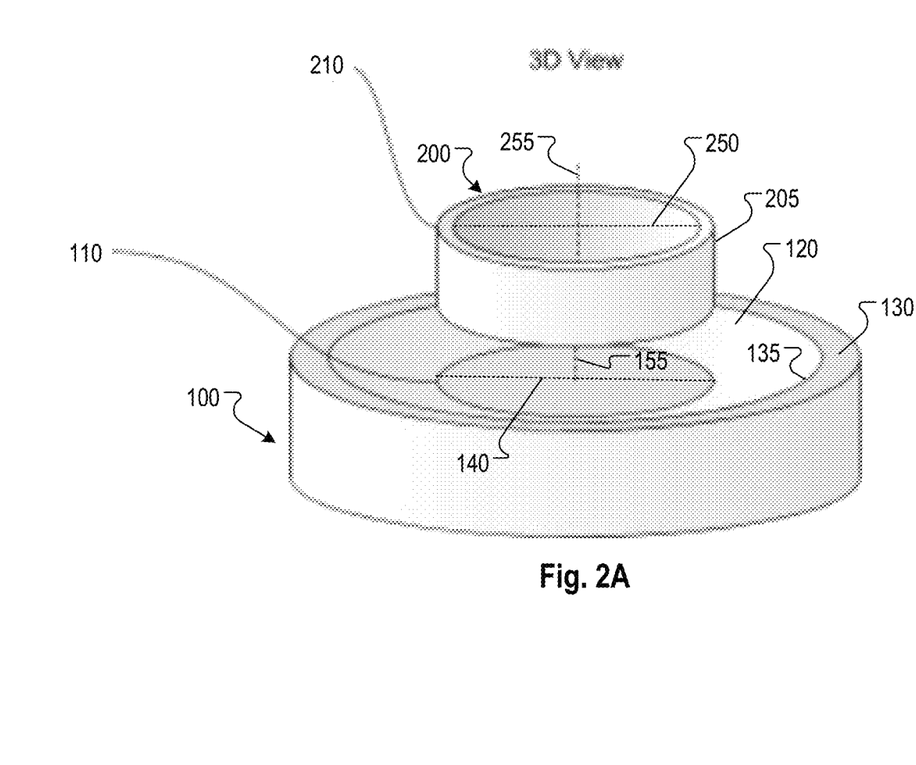
FIGS. 2A and 2B show an example configuration of a station for an unmanned aerial vehicle, including a section of the unmanned aerial vehicle used for landing on a station.
Figure 2B:
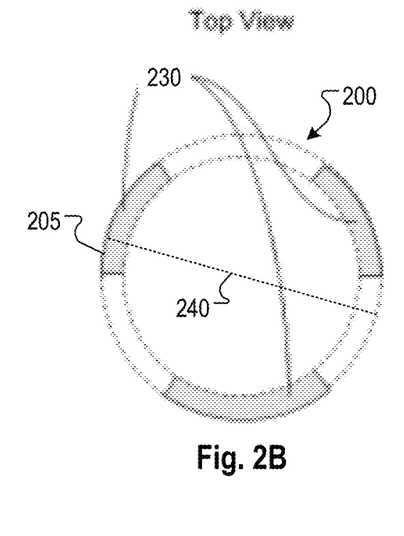

FIGS. 2A and 2B show an example configuration of a station for an unmanned aerial vehicle, including a section of the unmanned aerial vehicle used for landing on a station.

As indicated above, the drone 200 may have a body 205 with a profile that is a circular shape. For example, the dashed lines shown in the illustration of FIG. 2B indicates that the drone 200 may form a circle, which is evident when the drone 200 is viewed from a top (or bottom) point of view. The body 205 of the drone 200 can define an example landing gear 210. The landing gear 210 is represented by respective sections 230 of the body 205 along an example bottom edge of the drone 200. In some cases, the sections 230 represent respective circular sections of the landing gear 210 that are used to position the drone 200 at a particular area of the landing surface 110 on the station 100.

In some implementations, the landing gear 210 may be shaped as a cylinder or other suitable shape and configuration. Additionally or alternatively, the landing gear 210 may include one or more surfaces configured to form parts or portions of the respective circular sections 230. For example, portions of the landing gear 210 may be removed for weight savings or other suitable purposes, yet still include portions of the circular sections 230 that are configured to interface with the landing surface 110 of the station 100. In some examples, an outer diameter 240 of the body 205 of the drone 200 may be matched and/or approximately aligned with a diameter 140 of the station landing surface 110.

The positioning surface 120 may be a convex positioning (or sliding) surface. The positioning surface 120 may also be sloped relative to the landing surface 110. For example, the positioning surface 120 may be a flat or straight surface that is sloped or on a slant relative to the landing surface 110. In some cases, the landing surface 110 and the positioning surface 120 define a convex surface of the station 100. In some implementations, a bottom surface of the landing gear 210 may have a curved surface to facilitate sliding of the drone 200 along a convex "sliding surface" of the station 100 that corresponds to the positioning surface 120. Additionally or alternatively, the bottom surface of the landing gear 210 may be treated with, and/or manufactured of, a material to reduce friction to facilitate sliding of the landing gear 210 along the convex sliding surface of the station 100.

In some implementations, various components may be utilized to facilitate settling of the landing gear 210 within the landing surface 120, such as magnets. The landing surface 110 can include a groove (e.g., a circular groove) or channel that is configured to receive respective sections 230 of the drone 200 that correspond to the landing gear 210. For example, a circular groove of the landing surface 110 can have a channel profile that corresponds to a curved bottom surface of the landing gear 210. The channel profile of the groove at the landing surface 110 can be configured such that the bottom surface of the landing gear 210 can be seated in the circular groove when the drone 200 lands at the station 100. In some cases the circular groove includes a magnetic lining along its surface.

The positioning surface 120 of station 100 is configured to slope toward the landing surface 110 to facilitate guiding or passively directing the drone 200 toward the landing surface 110. In some implementations, during landing at the station 100, the drone 200 slides onto the positioning surface 120 toward a station center or central point 155 of the station 100. The circumference 150 of the station 100 extends radially from the central point 155. For example, the drone 200 can include an inner diameter 250 and a central point 255 that is defined by a radius of the drone's inner diameter 250. After landing, the drone 200 may be positioned on the landing surface 110, e.g., in the circular groove, by way of the positioning surface 120. For example, the drone 200 may be positioned on the landing surface 110 via the positioning surface 120 such that the central point 255 of the drone aligns with the central point 155 of the station 100.

In general, modifications, additions, or omissions may be made to the landing gear 210 without departing from the scope of the present disclosure. For example, in some implementations, the landing gear 210 may include any number of other components that may not be explicitly illustrated or described. Further, depending on certain implementations, the landing gear 210 may not include one or more of the components illustrated and described herein.

Figure 3:
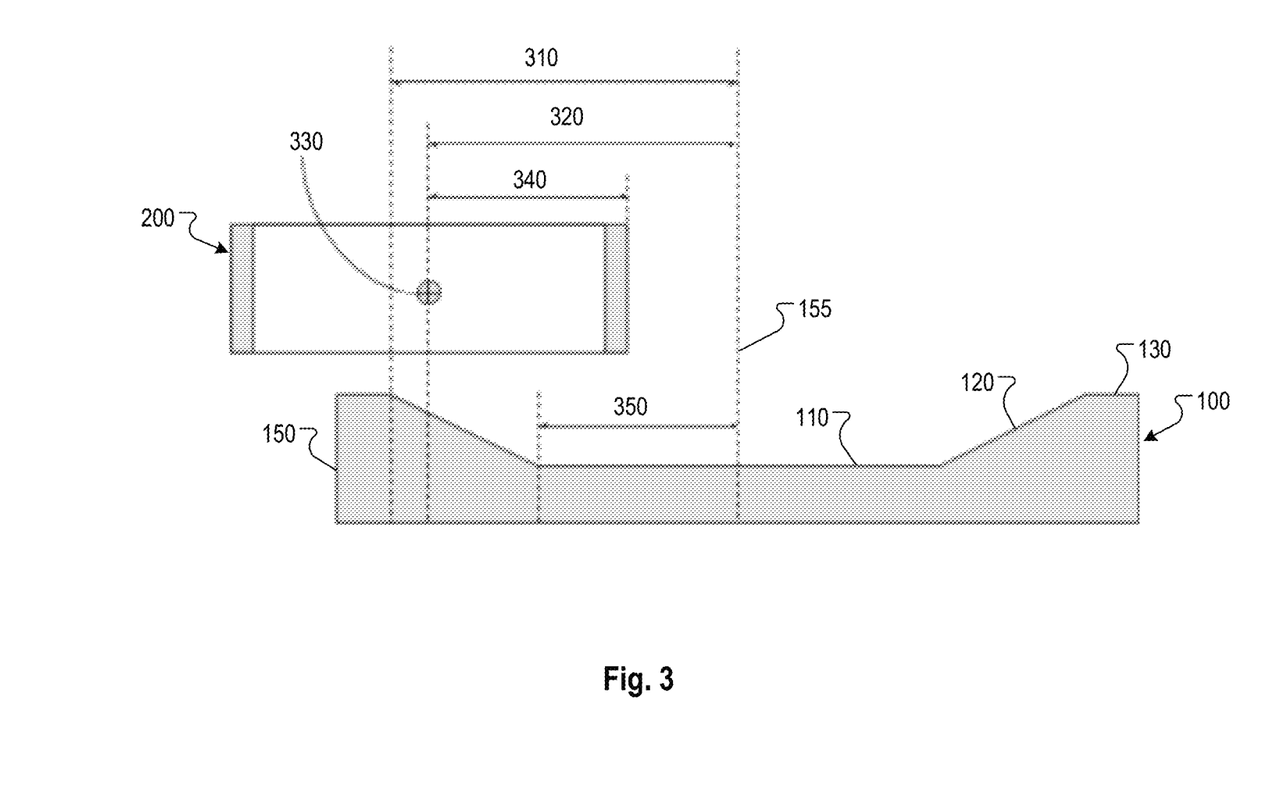
FIG. 3 shows an example configuration and related dimensions for a station and an unmanned aerial vehicle.

FIG. 3 shows an example configuration and related dimensions for a station and an unmanned aerial vehicle. The drone 200 is configured to initially land on a convex sliding surface of the station 100 and move or slide onto an example flat landing surface of the station 100. An expected error of landing procession can be observed, or can occur, when the drone 200 attempts to land on a surface of the station 100. In some implementations, an outer radius of the convex sliding surface of the station 100 is larger than a maximum expected error of landing precision (described below).

In the example of FIG. 3, an outer radius 310 of the station convex "sliding surface" may be larger than an expected error of landing precision 320. The expected error of landing precision 320 can be a maximum expected error or an average expected error. For example, the outer radius 310 may be larger than a maximum expected error of landing precision 320 or an approximate average expected error of landing precision 320. In other implementations, the outer radius 310 may be the same size as, or less than, the approximate average expected error of landing precision 320. The expected error of landing precision 320 can be measured in units such as inches, centimeters, or millimeters.

The maximum expected error of landing precision 320 can be measured relative to the station 100 (e.g., a center of the station), the drone 200 (e.g., a center of the drone), or both. For example, the maximum expected error of landing precision 320 can be measured as a distance between a vertical axis that corresponds to the central point 155 of the station 100 and a vertical axis that corresponds to the central point 255 of the drone 200. In some implementations, the vertical axis of the drone 200 extends through a center of gravity (COG) 330 of the drone 200 at a distance that is the maximum expected error of landing precision 320. For example, if the expected precision of a drone's ability to land precisely on the landing surface 110 is +/−10 cm, then the distance of the expected error of landing precision 320 would be approximately 10 cm from this vertical axis through the central point 155 of the station 100.

In some implementations, a first distance between a center of gravity of the drone 200 and an edge of the drone is less than a second distance between a center of the landing surface 110 and an outer edge of the positioning surface 120. In other implementations, a distance between a center of gravity of the drone 200 and an edge of the drone 200 is less than a maximum expected landing error distance of the drone 200. A first distance between a center of the landing surface 110 and an outer edge of the sliding surface 120 can also be greater than a maximum expected landing error distance 320 of the drone 200. The expected landing error distance 320 can be an expected distance between the center of gravity of the drone 200 and a center of the landing surface 110 when the drone 200 contacts the station 100.

The COG 330 of the drone 200 may be horizontally centered relative to an outer diameter 240 of the drone, the drone body 205, a landing gear outer radius 340, or a radius 350 of the landing surface 110. In some implementations, the radius 350 of the landing surface 110 may be approximately the same as the landing gear outer radius 340. The landing gear outer radius 340 also corresponds to an outer radius of the drone body 205.

In general, modifications, additions, or omissions may be made to the landing gear 210 and station 100 of FIG. 3 without departing from the scope of the present disclosure. For example, in some implementations, the landing gear 210 and station 100 of FIG. 3 may include any number of other components that may not be explicitly illustrated or described. Further, depending on certain implementations, the landing gear 210 and station 100 of FIG. 3 may not include one or more of the components illustrated and described herein.

Figure 4:
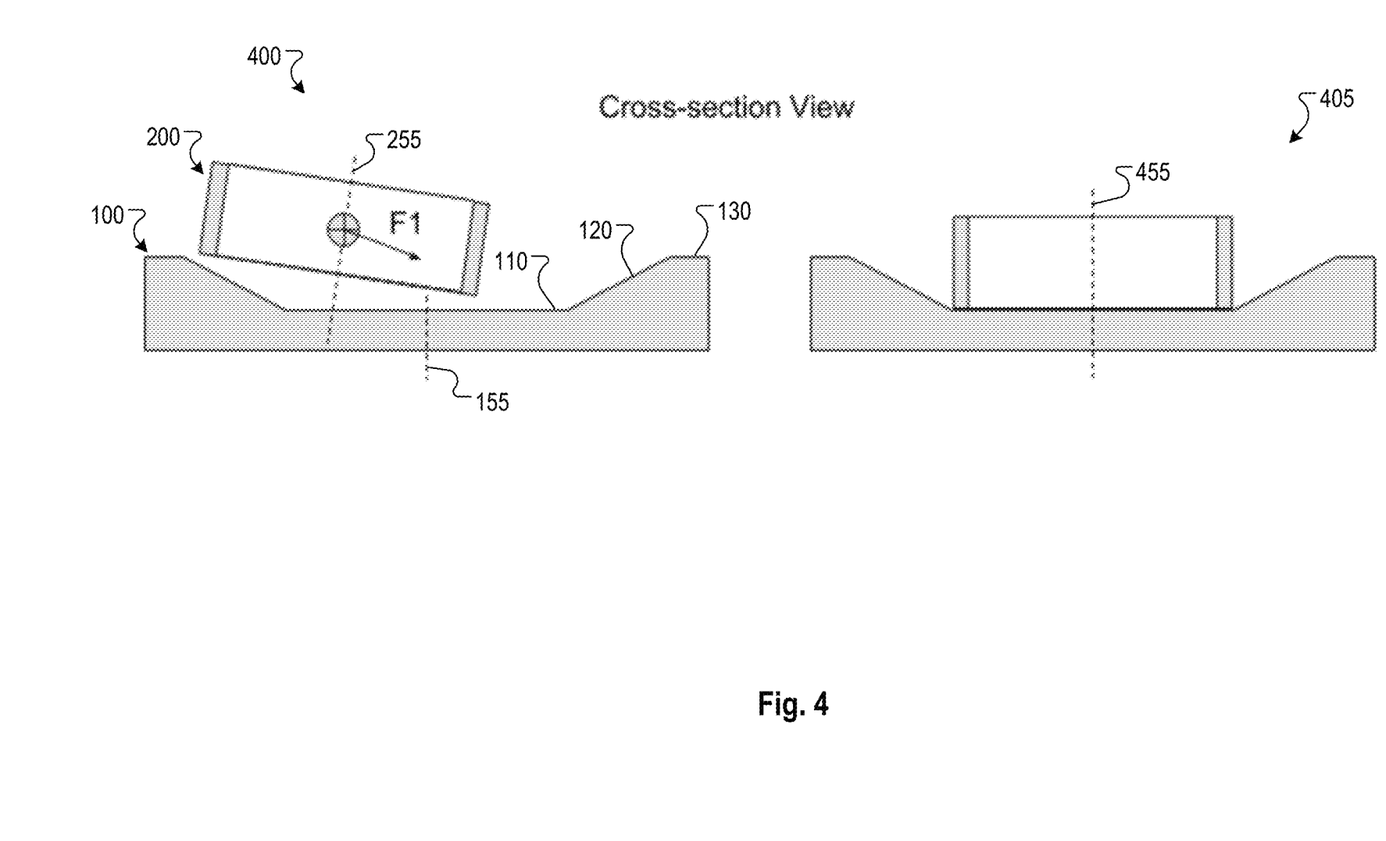
FIG. 4 shows example illustrations of a drone being positioned at a station.

FIG. 4 shows example illustrations of a drone being positioned at a station when landing at the station. The drone 200 can initiate a landing sequence at the station 100. The example of FIG. 4 shows two landing states 400 and 405. State 400 corresponds to when a drone is approaching the station 100 to land on a surface of the station 100. As the drone 200 begins landing on the station 100 an example ground effect may be observed when the drone 200 is within a threshold proximity of a surface of the station 100. As described above, a ground effect can include phenomena related to factors such as increased lift due to redirected and reflected airflow, increased turbulence that makes horizontal position control of the drone 200 more difficult, or both For example, a surface of the station 100 can reflect and redirect downwash airflow generated by an example propulsion system of the drone 200. As a result of the ground effect, friction between the drone 200 (e.g., landing gear 210 of the drone) and the station surfaces 110, 120 may be reduced. In some implementations, an example force F1 may be generated as a result of factors relating to ground effect. For example, the force F1 may result from the combined effects of: i) the known gravitational force exerted on terrestrial objects, ii) a station surface reaction force, iii) a tilted thrust vector of drone 200, iv) the lowered or reduced friction discussed above, and v) an airflow reflected from the convex positioning surface 120 of the station 100.

State 405 corresponds to when the force F1 acts on the drone 200 during its landing on a surface of the station 100. For example, the combined effects that result in force F1 can function to pull the drone 200 towards a center, or central point 155, of the station 100 until the vertical axis of the drone 200 and the vertical axis of the are aligned as shown at central point 455. In some implementations, the station 100 is configured to passively align a center of the drone 200 with a center of the landing surface 110 based on the force F1 that acts on the drone 200 during the drone's sequence of landing on a surface of the station 100. In some cases, the station 100 is configured to passively align a center of the drone 200 with a center of the landing surface 110 based on a gravitational force that causes the drone 200 to slide along the slanted or sloped positioning surface 120 toward the landing surface 110.

Figure 5:
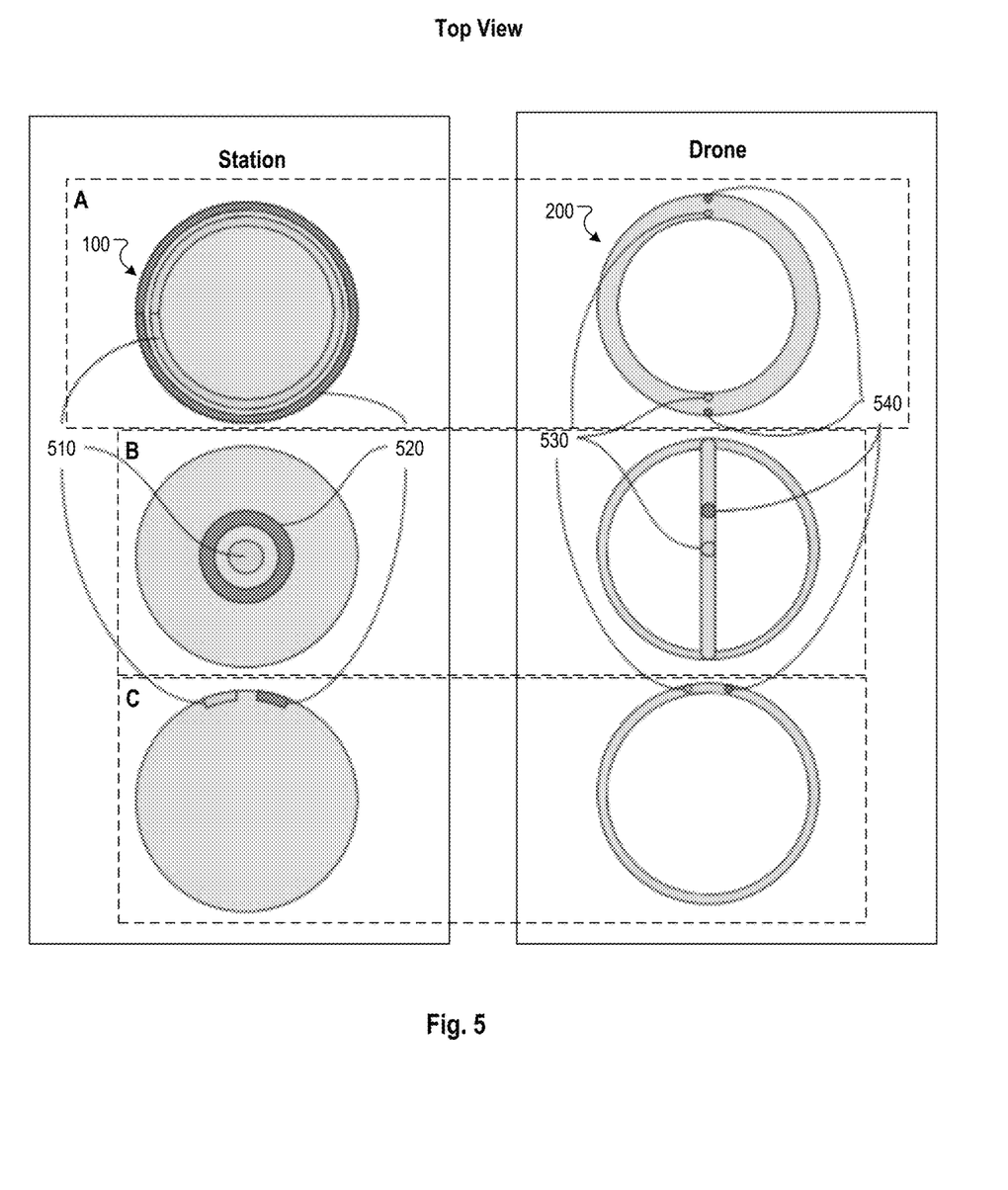
FIG. 5 shows example configurations of contacts integrated in a station.

FIG. 5 shows example configurations of contacts integrated in a station. For example, the station 100 can be a docking station or charging station that includes charging contacts. The drone 200 includes drone charging contacts that interact with the station charging contacts to pass charging signals corresponding to voltage and current to charge a power source of the drone 200. For example, the station charging contacts are configured to electrically couple to drone charging contacts of the drone to pass the charging signals from the station 100 to the drone 200.

For example, the station 100 includes one or more contacts that are each configured to interface with one or more corresponding contacts of the drone 200. In some implementations, contacts integrated at the station 100 are configured to recharge a battery or battery cell of the drone 200. The contacts integrated at the station 100 can be positioned in a central area of the station 100, an outer region of the station 100, or both. Each of the station 100 and the drone 200 can include charging and communication contacts that require alignment to facilitate a charging or communication function of the station 100 or drone 200.

In some implementations, charging and communication contacts on the drone and/or the station may be arranged in a circular pattern around a respective center axis or in respective center areas. In this manner, after the drone 200 has landed on a surface of the station 100, each of the respective center axis of the drone 200 and the station 100 may be aligned and one or more contacts of the drone 200 and the station may be also aligned. In these or other implementations, rotation of the drone 200 on the station 100 and/or rotation of the station 100 may be required to align corresponding contacts. For example, by changing a drone yaw angle before, during, or after the drone 200 lands on the station 100, one or more contacts for the drone 200 and the station 100 may be aligned.

The example of FIG. 5 illustrates example configurations of charging and communication contacts with respect to a station and a drone. For example, at FIG. 5, a pair of contacts of the station 100 is illustrated, however other configurations may include more than one pair of contacts as required to for charging or communication between a drone 200 and a station 100. In the example of FIG. 5, a first contact pad 510 and a second contact pad 520 are each shown on the station 100. Relatedly, a first contact pin 530 and a second contact pin 540 are each shown on the drone 200.

The landing surface 110 includes station charging contacts that are configured to electrically couple to drone charging contacts of the drone 200. In some implementations, the contacts pads 510, 520 of the station 100 and the contact pins 530, 540 of the drone 200 are configured for wireless charging and communication between the station 100 and the drone 200. The station 100 charging contacts can be concentric annuli contacts or concentric annulus and circle. In some implementations, the landing surface 110 is a circle, and the positioning surface 120 is an annulus that surrounds the circular landing surface 110.

The station 100 can include circuitry for actuating and moving the landing surface 110 relative to another item of the station 100. For example, the landing surface 110 can be actuated and moved relative to the positioning surface 120. The station 100 is operable to move the landing surface 110 to facilitate alignment and precision landing of the drone 200 on the landing surface 110. In some examples, the station 110 can move the landing surface 110 up or down or increase a slope of the positioning surface 120 or raise the entire positioning surface 120 using an actuator or electromagnetic motors and solenoids of the station 100.

Each of the station 100 and drone 200 may have pads or pins or a mix of pads and pins for charging and communication between each device. In some implementations, the example configurations A and B may not require adjustment of the drone 200 and/or the station. For example, the drone may not need to adjust its yaw angle to engage the contacts. Additionally or alternatively, the configuration C may, in some embodiments, impose adjustment operations of the drone and/or the station prior to charging. For example, the drone may rotate to align the drone contacts with the station contacts prior to charging. In some embodiments, various components may be utilized to facilitate alignment of landing gear 210 within the landing surface 110, such as magnets to facilitate proper alignment in configuration C.

In general, modifications, additions, or omissions may be made to the drone pins/contacts and station contacts of FIG. 5 without departing from the scope of the present disclosure. For example, in some implementations, the drone contact pins and station contacts of FIG. 5 may include any number of other components that may not be explicitly illustrated or described. Further, depending on certain implementations, the drone pins/contacts and station contacts of FIG. 5 may not include one or more of the components illustrated and described herein.

Figure 6:
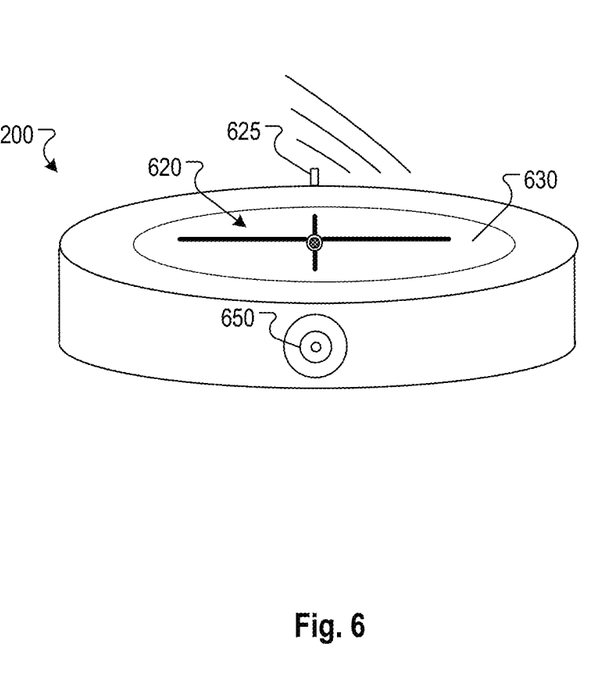
FIG. 6 shows an example unmanned aerial vehicle.

FIG. 6 shows an example unmanned aerial vehicle. The UAV in the example of FIG. 6 represents an example configuration of the drone 200 described above. The drone 200 includes example components of a flight control 620 that are installed at an opening 630 of a housing or frame of the drone 200. The opening 630 of the drone 200 is configured to receive one or more components of a flight control 620 installed at the drone 200. The example components of the flight control 620 can include example propulsion or flight control system components, such as: motors, rotors, propellers, and/or a propulsion or flight control system holding frame.

Similarly, the drone 200 includes other components that are internal to the drone. For example, these other components include a power source, circuits or integrated circuit components, sensing devices 650, and electrical wires for electrically connecting and routing signal communications between the various components of the drone 200.

In some implementations, control signals generated by the circuit of drone 200 are used to control the drone 200 at least by controlling the one or more components of the flight control 620. For example, the circuit includes a processor and memory (e.g., a non-transitory machine-readable storage device) storing instructions that are executable by the processor to cause performance of operations related to controlling the drone 200 or using the drone 200 to monitor conditions at a property (described below). The operations include obtaining image data using the imaging device 650. For example, the device 650 can be a digital camera that is operable to capture images and record video.

The drone 200 uses the circuit to transmit control signals to the digital camera 650 to obtain images and video of objects external to the drone 200. The obtained images and video can be used to control a flight path of the drone 200 or collected for further analysis and processing at a remote monitoring server (described below). The images and video may be transmitted as sensor data based on signal transmissions performed using an example antenna 625 of the drone 200. In some cases the antenna 625 may be integrated in the frame of the drone or positioned at a location that is inside the drone or frame such that the antenna 625 is not visible at the exterior of the drone.

The operations also include processing the image data using the processor of the circuit and controlling the drone 200 based on the processing. For example, the images can be processed to detect objects that are external to the drone 200 or to monitor conditions that are external to the drone 200. In some implementations, the operations include controlling the drone 200 based on the detected objects and in response to processing the image data.

Figure 7:
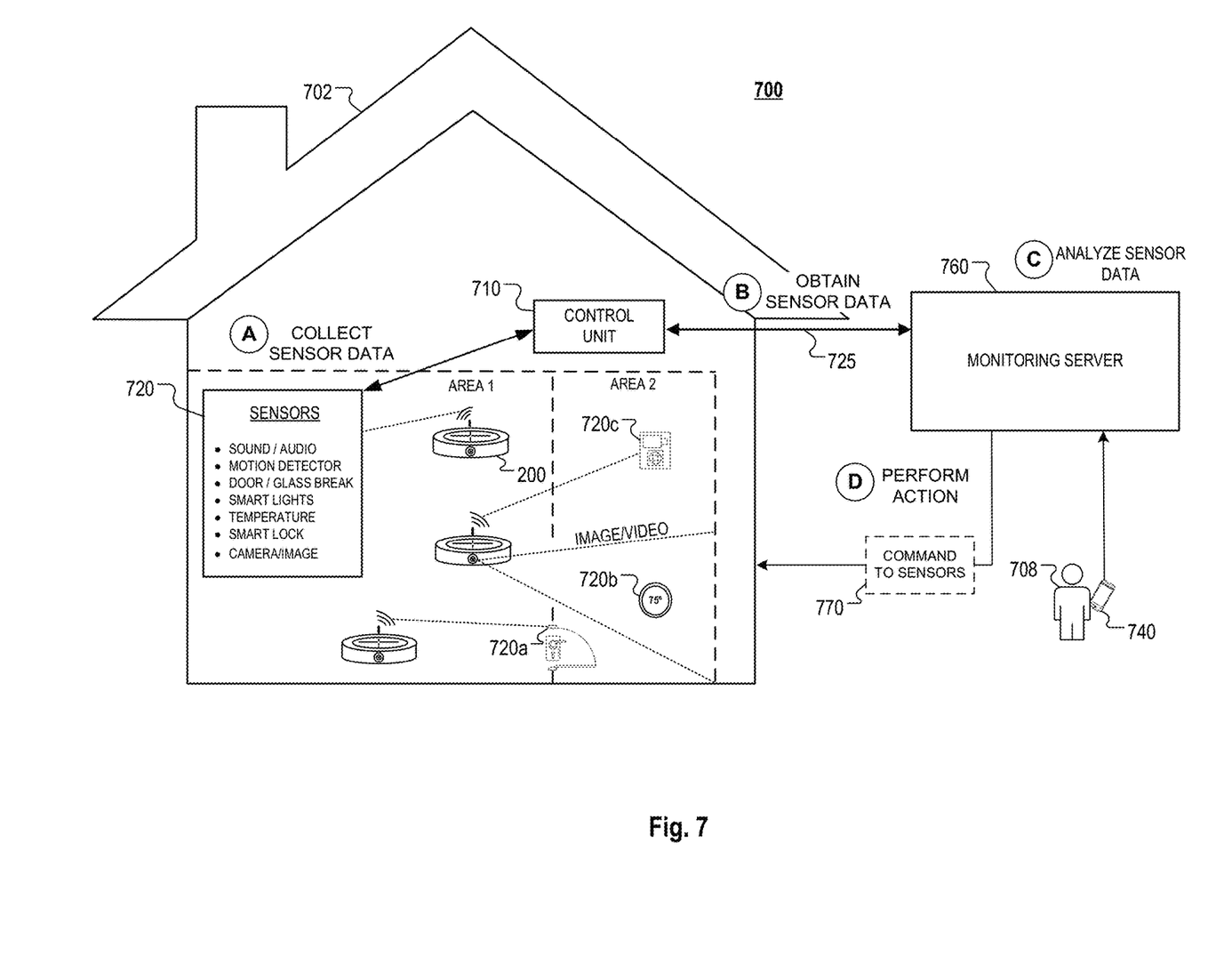
FIG. 7 shows a block diagram of an example property and property monitoring system that includes drones for monitoring conditions at the property.

FIG. 7 shows a block diagram of an example property monitoring system 700 ("system 700") that includes drones 610 for monitoring conditions at the property. System 700 can be used to perform one or more actions for securing a property 702. The property 702 may be, for example, a residence, such as a single family home, a townhouse, a condominium, or an apartment. In some examples, the property 702 may be a commercial property, a place of business, or a public property, such as a police station, fire department, or military installation.

The system 700 can include multiple sensors 720. Each sensor 720 can be associated with various types of devices that are located at property 702. For example, a sensor(s) can be associated with contact sensor 720a that is operable to detect when a door or window is opened or closed. In some examples, a sensor can be a temperature control device 720b that is operable to control a temperature setting for an area or room at the property 702. Similarly, a sensor can be associated with a video or image recording device 720c located at the property 702, such as a digital camera or other electronic recording device.

As described above, the property 702 is monitored by a property monitoring system. The property monitoring system includes a control unit 710 that sends sensor data 725, obtained using sensors 720, to a remote monitoring server 760. In some implementations, the control units, monitoring servers, or other computing modules described herein are included as sub-systems of the property monitoring system 700. Each of the sensors 720 can use various types of technology to transmit sensor signal data or to exchange data communications with devices of system 700 (or the property monitoring system). In some implementations, one or more sensors 720 at the property 702 can be at least one of: a Z-Wave enabled sensing device, a Bluetooth enabled sensing device, a Wi-Fi enabled sensing device, or a sensing device that uses radio or wireless signal technology. Additional sensor features are described in more detail below.

The system 700 also includes a drone 200 that is operable to generate image data which may be transmitted as sensor data 725 to the monitoring server 760. The image data can be processed at the monitoring server 760 to monitor and determine conditions at the property or to generate a layout or mapping of items or objects, including sensors 720, at the property 702. For example, a drone 200 can be used to survey the property 702 to determine whether items are secure at the property or to build a multi-dimensional map, such as a two-dimensional (2D) or three-dimensional (3D) model that includes 2D/3D map or physical layout of the property 702. In some implementations, the drone 200 surveys the property 702 and transmits parameters (or parameter values), sensor/drone data, and status information to the monitoring server 760 to determine conditions at the property or to generate the multi-dimensional map/model.

For example, the drone 200 is operable to transmit: (i) parameter signals that characterize a status or attribute of the items, (ii) data that describes communications and interactions between the drone 200 and each of the sensors 720 or items at the property 702, and (iii) imagery data (e.g., "mapping data") about the property 702 to the monitoring server 760 to generate the multi-dimensional model. In some examples, the drone 200 interacts with the monitoring server 760 to determine the conditions concurrent with the drone 200 performing the survey of property 702.

The drone 200 are operable to receive commands 770 and other signals from the monitoring server 760 or from a client device 740 of a user 708. In some implementations, the command 770 is a data payload that includes instructions and data values for commanding the drone 200 to perform one or more specific functions at the property 702. For example, a command 770 can cause the drone 200 to travel to a particular area of the property 702, triggering of a particular sensor 720 at the property 702, or transmitting imagery or mapping data from the drone 200 to the monitoring server 760.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner. Additionally, the terms "about," "substantially," or "approximately" should be interpreted to mean a value within 10% of an actual value, for example, values like 3 mm or 100% (percent).

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system comprising:
a docking station a) to receive a drone and b) that is located at a property and that comprises:
a landing surface that is parallel to the floor; and
a positioning surface i) that slopes towards the landing surface, ii) and has an outer edge a first distance from a center of the landing surface, the first distance being greater than a maximum expected landing error distance of the drone that is an expected distance between the center of gravity of the drone and a center of the landing surface when the drone contacts the docking station and iii) that is configured to receive the drone and passively direct the drone to the landing surface.

2. The system of claim 1, wherein:
the first distance between a center of the landing surface and the outer edge of the positioning surface is greater than or equal to a first distance between a center of gravity of the drone and an edge of the drone.

3. The system of claim 1, wherein:
the first distance being greater than the maximum expected landing error distance that is greater than or equal to a distance between a center of gravity of the drone and an edge of the drone.

4. The system of claim 1, wherein the landing surface and the positioning surface define a convex surface.

5. The system of claim 1, wherein the docking station is configured to passively align a center of the drone with a center of the landing surface.

6. The system of claim 1, wherein the docking station is configured to passively align a center of the drone with a center of the landing surface based on a gravitational force that causes the drone to slide along the positioning surface toward the landing surface.

7. The system of claim 1, wherein the docking station is configured to passively align a center of the drone with a center of the landing surface based on a magnetic force applied to the drone by a magnet integrated at the docking station.

8. The system of claim 7, wherein the magnetic force causes the drone to slide along the positioning surface toward the landing surface to align a center of the drone with a center of the landing surface.

9. The system of claim 1, wherein the landing surface includes docking station charging contacts that are configured to electrically couple to drone charging contacts of the drone.

10. The system of claim 9, wherein the docking station charging contacts are concentric annuli.

11. The system of claim 9, wherein the docking station charging contacts are a concentric annulus and circle.

12. The system of claim 1, wherein the landing surface includes docking station charging contacts that are configured to electrically couple to drone charging contacts of the drone to wirelessly charge a power source of the drone.

13. The system of claim 1, wherein:
the landing surface is a circle, and
the positioning surface is an annulus that surrounds the landing surface.

14. The system of claim 1, wherein docking station includes circuitry that is operable to move the landing surface relative to the positioning surface to align a center of the drone with a center of the landing surface.

15. The system of claim 1, wherein:
the docking station has an inner circumference and an outer circumference, outer circumference circumscribing the inner circumference; and the positioning surface slopes from the inner circumference of the docking station towards a circular circumference of the landing surface.

16. The system of claim 15, wherein a continuous surface is formed between the outer circumference and the inner circumference.

17. The system of claim 16, wherein the docking station further comprises:
a top edge surface extending from the outer circumference to an inner radius that extends radially from a center of the docking station.

18. The system of claim 15, wherein the positioning surface is conical.

19. The system of claim 15, wherein the docking station has an inner circumference and an outer circumference, outer circumference circumscribing the inner circumference, and a horizontal distance between the inner circumference and the outer circumference of the docking station is less than a diameter of the landing surface.

20. The system of claim 1, wherein at a given height from a center of the landing surface, a radial length from the center of the landing surface to a surface of the positioning surface is substantially a same magnitude.

21. A monitoring system that is configured to monitor a property, the monitoring system comprising:
a drone that is configured to navigate the property; and
a docking station that is located at the property and that comprises:
a landing surface that is parallel to the floor; and
a positioning surface that slopes towards the landing surface and that is configured to receive the drone and passively direct the drone to the landing surface, wherein a first distance between a center of the landing surface and an outer edge of the positioning surface is greater than a maximum expected landing error distance of the drone, wherein the expected landing error distance is an expected distance between the center of gravity of the drone and a center of the landing surface when the drone contacts the docking station.

* * * * *